United States Patent Office 3,376,176
Patented Apr. 2, 1968

3,376,176
AQUEOUS INORGANIC NITRATE SALT SLURRY CONTAINING NITRIC ACID AND ENTRAPPED AIR
Neil E. Gehrig, Schuylkill Haven, Pa., assignor to Atlas Chemical Industries, Inc., Wilmington, Del., a corporation of Delaware
No Drawing. Continuation of application Ser. No. 411,698, Nov. 17, 1964, now Patent No. 3,296,044, dated Jan. 3, 1967. This application Dec. 23, 1966, Ser. No. 604,202
6 Claims. (Cl. 149—46)

ABSTRACT OF THE DISCLOSURE

A sensitized blasting composition prepared by a method wherein an inorganic nitrate, a nitric acid sensitizer, an acid resistant surfactant or an acid resistant stabilizer or both, and air are mixed as an aqueous slurry containing entrapped air.

This application for U.S. Letters Patent is a continuation of copending U.S. patent application Ser. No. 411,698, filed Nov. 17, 1964, now U.S. Pat. 3,296,044, which in turn is a continuation-in-part of application Ser. No. 280,128 filed May 13, 1963, now U.S. Patent No. 3,164,503, the disclosure of which is hereby incorporated herein.

This invention relates to blasting agents containing nitric acid as an essential component thereof and particularly to blasting agents which are comprised of an aqueous solution of nitric acid, an inorganic nitrate, an immiscible carbonaceous fuel, an acid-resistant stabilizer and a catalyst.

The compositions of the present invention have the advantage of performing as powerful explosives but do not contain in the preferred embodiments a sensitive high explosive component. The preferred embodiments of the subject invention are highly insensitive to usual mechanical shock but are sensitive to detonation when initiated by conventional blasting caps generally used in the art. Furthermore, the explosive agents of this invention possess excellent shelf life.

More particularly preferred compositions of the present invention are gelled emulsions comprising an aqueous solution of nitric acid, an inorganic nitrate, an immiscible carbonaceous fuel, an acid-resistant surfactant, an acid-resistant stabilizer and a gelation catalyst. These gelled emulsions possess excellent stability and retain cap sensitivity during storage.

The term "immiscible" as used herein is defined as an inability to form a stable homogeneous mixture with an aqueous solution of nitric acid containing between about 30% and about 80% by weight of nitric acid.

The various suitable components, their proportions, and the physical form of the present invention will be described in more detail in the following sections:

Nitric acid

The nitric acid component of the present mixtures preferably is an aqueous solution of nitric acid containing between about 30% and about 80% by weight of nitric acid. Aqueous solutions of about 60% by weight of nitric acid aptly suited to use in the present mixtures are readily available in the commercial market. Such solutions are less reactive and much less expensive than more highly concentrated nitric acid solutions. Although a more highly concentrated nitric acid solution can be used in the present invention, the hazards of handling are not compensated by a substantial increase in the effectiveness of the final mixture. However, if desired, concentrated nitric acid and an appropriate amount of water may be separately added and incorporated into the mixtures. Since the nitric acid and water be separately added to the present mixtures, the concentration of the aqueous solution of nitric acid is defined as $$\frac{\text{Total weight } HNO_3 \text{ in the mixture}}{\text{Total weight of } HNO_3 \text{ in the mixture} + \text{Total weight of water in the mixture}} \times 100$$

Nitric acid having a concentration of less than about 30% frequently yields a product which is insensitive to normal detonation means. Nitric acid having a concentration of greater than about 40% is usually preferred and generally produces a final composition having a satisfactory detonation velocity and sensitivity.

Ammonium and metal nitrate

While commercially available "fertilizer grade" ammonium nitrate is suited to use in the mixture of the present invention sodium and potassium nitrates may also be used. Preferably, the nitrate component is in particulate form, that is, having a size that will pass a No. 8 USS screen. A nitrate component in particulate form, for example, in the form of prills, pellets or granules, is aptly suited to use in the present mixtures. Generally, the gelled emulsion compositions will contain from about 20 to about 500 parts of an inorganic nitrate component selected from the group consisting of ammonium and alkali metal nitrates based on 100 parts by weight of aqueous nitric acid containing from about 30% to about 80% by weight of nitric acid.

Immiscible carbonaceous fuel material

The compositions of the present invention include a fuel material which is immiscible with an aqueous solution of nitric acid. Generally hydrocarbons whether paraffinic, olefinic, naphthenic, aromatic, saturated or unsaturated are suitable as the carbonaceous fuel component. However, other materials such as saturated fatty acids, higher alcohols having a chain length of from about 6 to 18 carbon atoms, and liquid or solid polyethylene glycols are found to be generally suitable.

Examples of hydrocarbon fuels suitable in the subject invention are paraffin, paraffin-based waxes, diesel fuel oil, mineral oil and similar based petroleum products.

Saturated fatty acids suitable for use in this invention include octanoic acid, decanoic acid, lauric acid, palmitic acid, behenic acid and cerotic acid.

Suitable higher alcohols include hexyl alcohol, nonyl alcohol, lauryl alcohol, cetyl alcohol and stearyl alcohol.

Other immiscible, carbonaceous fuels useful in the present invention are vegetable oils such as corn oil, cotton-seel oil and soybean oil. Powdered carbon is also suitable to supply the required carbonaceous fuel component of the subject invention. Carbohydrate materials, for example, sugars in dry form, such as sucrose or in solution, such as molasses, may be utilized as supplemental fuels. In addition, any carbonaceous fuel substantially unreactive with nitric acid on simple mixing may be used in the subject compositions as the fuel component.

The fuel materials selected for use in the present invention will generally depend upon the desired physical form of the final product. The firmness of the gelled emulsion may be varied depending on which fuel material is used.

Generally, the present compositions contain about 6 to about 150 parts by weight of immiscible, carbonaceous fuel based on 100 parts by weight of nitric acid solution containing between about 30% and about 80% nitric acid.

Acid resistant surfactant

The present compositions preferably contain small amounts of a suitable surfactant. Generally, up to about 50 parts by weight of surfactant is desirable based on 100 parts of an aqueous solution of nitric acid containing between about 30% and about 80% by weight of nitric acid to aid in obtaining and maintaining a homogenous mixture. Most often, from about 1.5 to about 30 parts by weight based on 100 parts of nitric acid solution of a surfactant suitably emulsifies the present mixtures; however, additional surfactant, up to about 50 parts may be added without noticeable harmful effects. The surplus surfactant may be beneficial in that it supplies an additional supplemental fuel to the mixture. Some of the surfactants that have been found to be suitable are sorbitan monooleate, sorbitan monopalmitate, and sorbitan monostearate.

Acid resistant stabilizer

The present mixtures also include a small amount of a stabilizing material. Generally, between about 0.3 and about 50 parts by weight of stabilizer based on 100 parts by weight of nitric acid solution is used to aid in the formation of the subject stable gelled emulsions depending on storage requirements. In most cases, from about 1 to about 30 parts by weight based on 100 parts by weight of nitric acid solution of an acid-resistant stabilizer is used to stabilize the present emulsion; however, additional stabilizer, up to about 50 parts may be added without harmful effects. Some of the acid-resistant stabilizers that have been found to be suitable are colloidal silica, polymers and copolymers of acrylamide, copolymers of methyl vinyl ether-maleic anhydride, polyacrylic acid, and other water-soluble acrylic polymers. However, any acid resistant stabilizer that will form a gel structure in the subject mixture is suitable.

A mixture of polymers and copolymers of acrylamide, sold under the trade name "Cyanogum 41," a product of American Cyanamid Co., is a suitable stabilizer. Copolymers of methyl vinyl ether-maleic anhydride sold under the trade name "Gantrez" by the General Aniline and Film Co. are suited to use. Various viscosity grades of "Gantrez" are available. Among those found suitable are "Gantrez AN–119" (low viscosity), "Gantrez AN–139" (medium viscosity), "Gantrez AN–149" (medium viscosity) and "Gantrez AN–169" (high viscosity).

Catalysts

A suitable catalyst is incorporated into the subject mixtures to promote the formation of the desired gelled structure. It appears likely that the subject catalysts act to increase the reaction rate between he components; thereby causing formation of a gelled emulsion possessing the desired properties. As a result of the rapid formation of this gelled emulsion a capsensitive explosive product is obtained whose sensitivity is retained during storage. Tri-valent iron salts and tri-valent aluminum salts have been found to act suitably as catalysts in the subject compositions. Suitable iron salts include ferric sulfate, ferric chloride and ferric nitrate.

Among suitable aluminum salts are aluminum sulfate, aluminum chloride and aluminum nitrate.

Tetra-valent tin salts also act as gelation catalysts in the present compositions. Among suitable tin salts are stannic chloride, stannic nitrate and stannic sulfate.

Additional catalysts that perform satisfactorily in the subject compositions are polyethylenimine, polyethylenimine nitrate, diethylene-triamine, triethylenetetramine, rhodamine B and aminoglycerol.

Generally from about 0.1 to about 66 parts by weight of catalyst based on 100 parts by weight of nitric acid solution is used in the subject compositions depending on storage requirements. Most often, from about 0.3 to about 30 parts by weight of a gelation catalyst is used based on 100 parts of nitric acid solution. Quantities below 0.3 part based on 100 parts nitric acid solution may produce an insufficient effect for prolong storage requirements; however additional catalyst, up to about 66 parts may be added without noticeable harmful effects.

Other additives

The compositions of the present invention may include other ingredients to modify the physical properties of the mixture. For example, ammonium nitrate or alkali metal nitrates may be initially treated with a thin coating of protective material to minimize attrition and caking of the particles. A thin coat of clay, diatomaceous earth, or organic agents, such as a mixture of sulfonates of mono- and/or dimethyl napthalenes are frequently used as additives to particulate nitrates. Generally the inorganic additives such as clay are present in an amount of from about 0.5 to about 5.0% by weight of ammonium or alkali metal nitrate. The organic additives are frequently effective in amounts as low as 0.05% by weight of the nitrate component.

The sensitivity and detonation velocity of the slurry and solidified dispersion forms of the present invention usually may be stabilized by the addition of an inert, non-explosive propagation sustaining material, for example, expanded particulate perlite, or hollow glass balls. Generally about 1 part by weight of the propagation sustaining material, based on 100 parts by weight of a 60% nitric acid solution, is required to obtain an advantage and usually more than about 70 parts fails to yield further improvement. Suitable propagation sustaining material has a size range that will pass through a No. 8 USS screen to a No. 100 USS screen. Expanded perlite, a commercially available material, is the mineral perlite, a volcanic glass composed largely of aluminum silicate, which has been put through a heating process so that it is expanded into an extremely light cellular form.

The compositions of this invention may be used as a dynamite type product or as an effective primer for nitro-carbonitrate blasting agents.

The gelled emulsion formulas of this invention may be molded, cast or extruded into any desired shape. The preferred embodiments of the present invention require that the components be proportioned within rather specific ranges; therefore the final mixture may be heated to drive off excess entrapped air. However, the finished gelled emulsion products of this invention suitably contain a relatively large quantity of entrapped air. The products of this invention are prepared within a density range of from about 0.5 to about 1.60. The subject formulas may be varied so as to produce a solid mixture by varying the carbonaceous fuel component and/or suitably extending the heating step.

This invention will be more readily understood from a consideration of the following examples of preferred embodiments.

EXAMPLES

Each of the examples set forth below are prepared according to the following procedure:

The nitrate, stabilizer and catalyst were combined and mixed one minute by means of mechanical agitation. The fuel and surfactant, when present, were blended together, mixed one minute and then added to the above mixture. The resulting combination was stirred one minute and then the nitric acid was incorporated therein under mechanical agitation. Lastly, the mixture was placed in suitable packaging for explosive use.

In the examples, all quantities of ingredients refer to parts by weight.

EXAMPLE I
| | |
|---|---|
| Paraffin | 6.0 |
| Mineral oil | 2.0 |
| Sorbitan monopalmitate | 2.0 |
| "Gantrez AN-169" | 2.0 |
| Ferric sulfate | 1.0 |
| Sodium nitrate | 10.0 |
| Ammonium nitrate | 47.0 |
| Nitric acid (60%) | 30.0 |

EXAMPLE II
| | |
|---|---|
| Paraffin | 6.0 |
| Sorbitan monopalmitate | 2.0 |
| "Gantrez AN-169" | 2.0 |
| Ferric sulfate | 1.0 |
| Sodium nitrate | 10.0 |
| Nitric acid (60%) | 30.0 |
| Ammonium nitrate | 49.0 |

EXAMPLE III
| | |
|---|---|
| Paraffin | 4.0 |
| Carbon (powdered) | 2.0 |
| Sorbitan monopalmitate | 2.0 |
| "Gantrez AN-169" | 2.0 |
| Ferric sulfate | 1.0 |
| Sodium nitrate | 10.0 |
| Nitric acid (60%) | 30.0 |
| Ammonium nitrate | 49.0 |

EXAMPLE IV
| | |
|---|---|
| Mineral oil | 4.0 |
| Carbon (powdered) | 2.0 |
| Sorbitan monopalmitate | 2.0 |
| "Gantrez AN-169" | 2.0 |
| Ferric sulfate | 1.0 |
| Sodium nitrate | 10.0 |
| Nitric acid (60%) | 30.0 |
| Ammonium nitrate | 49.0 |

EXAMPLE V
| | |
|---|---|
| Paraffin | 4.0 |
| Oleic acid | 2.0 |
| Sorbitan monopalmitate | 2.0 |
| "Gantrez AN-169" | 2.0 |
| Ferric sulfate | 1.0 |
| Sodium nitrate | 10.0 |
| Nitric acid (60%) | 30.0 |
| Ammonium nitrate | 49.0 |

EXAMPLE VI
| | |
|---|---|
| Paraffin | 2.0 |
| Palmitic acid | 4.0 |
| Sorbitan monopalmitate | 2.0 |
| "Gantrez AN-169" | 2.0 |
| Ferric sulfate | 1.0 |
| Sodium nitrate | 10.0 |
| Nitric acid (60%) | 30.0 |
| Ammonium nitrate | 49.0 |

EXAMPLE VII
| | |
|---|---|
| Paraffin | 4.0 |
| Lauryl alcohol | 2.0 |
| Sorbitan monopalmitate | 2.0 |
| "Gantrez AN-119" | 2.0 |
| Ferric sulfate | 1.0 |
| Sodium nitrate | 10.0 |
| Nitric acid (60%) | 30.0 |
| Ammonium nitrate | 49.0 |

EXAMPLE VIII
| | |
|---|---|
| Paraffin | 4.0 |
| Cottonseed oil | 2.0 |
| Sorbitan monopalmitate | 2.0 |
| "Gantrez AN-119" | 2.0 |
| Ferric sulfate | 1.0 |
| Sodium nitrate | 10.0 |
| Nitric acid (60%) | 30.0 |
| Ammonium nitrate | 49.0 |

EXAMPLE IX
| | |
|---|---|
| Cottonseed oil | 6.0 |
| Sorbitan monopalmitate | 2.0 |
| "Gantrez AN-149" | 2.0 |
| Ferric sulfate | 1.0 |
| Sodium nitrate | 10.0 |
| Nitric acid (60%) | 30.0 |
| Ammonium nitrate | 49.0 |

EXAMPLE X
| | |
|---|---|
| Mineral oil | 6.0 |
| Sorbitan monopalmitate | 2.0 |
| "Gantrez AN-149" | 2.0 |
| Ferric sulfate | 1.0 |
| Sodium nitrate | 10.0 |
| Nitric acid (60%) | 30.0 |
| Ammonium nitrate | 49.0 |

EXAMPLE XI
| | |
|---|---|
| Paraffin | 1.0 |
| Mineral oil | 0.5 |
| Sorbitan monopalmitate | 0.5 |
| "Gantrez AN-169" | 0.1 |
| Ferric sulfate | 0.1 |
| Sodium nitrate | 10.0 |
| Nitric acid (60%) | 30.0 |
| Ammonium nitrate | 49.0 |

EXAMPLE XII
| | |
|---|---|
| Paraffin | 1.0 |
| Mineral oil | 0.5 |
| Sorbitan monopalmitate | 0.5 |
| "Gantrez AN-139" | 0.1 |
| Ferric sulfate | 0.1 |
| Sodium nitrate | 10.0 |
| Nitric acid (40%) | 30.0 |
| Ammonium nitrate | 57.8 |

EXAMPLE XIII
| | |
|---|---|
| Paraffin | 14.0 |
| Mineral oil | 7.0 |
| Sorbitan monopalmitate | 7.0 |
| "Gantrez AN-169" | 1.5 |
| Ferric sulfate | 1.0 |
| Sodium nitrate | 10.0 |
| Nitric acid (40%) | 20.0 |
| Ammonium nitrate | 39.5 |

EXAMPLE XIV
| | |
|---|---|
| Paraffin | 14.0 |
| Mineral oil | 7.0 |
| Sorbitan monopalmitate | 7.0 |
| "Gantrez AN-169" | 2.0 |
| Ferric sulfate | 1.0 |
| Sodium nitrate | 10.0 |
| Nitric acid (60%) | 30.0 |
| Ammonium nitrate | 29.0 |

EXAMPLE XV
| | |
|---|---|
| Paraffin | 14.0 |
| Mineral oil | 7.0 |
| Sorbitan monopalmitate | 7.0 |
| "Gantrez AN-139" | 1.5 |
| Ferric sulfate | 1.0 |
| Sodium nitrate | 10.0 |
| Nitric acid (60%) | 20.0 |
| Ammonium nitrate | 39.5 |

EXAMPLE XVI

| | |
|---|---|
| Paraffin | 14.0 |
| Mineral oil | 7.0 |
| Sorbitan monopalmitate | 7.0 |
| "Gantrez AN-169" | 2.0 |
| Ferric sulfate | 1.0 |
| Sodium nitrate | 10.0 |
| Nitric acid (40%) | 30.0 |
| Ammonium nitrate | 29.0 |

EXAMPLE XVII

| | |
|---|---|
| Paraffin | 1.0 |
| Mineral oil | 0.5 |
| Sorbitan monopalmitate | 0.5 |
| "Gantrez AN-169" | 2.0 |
| Ferric sulfate | 1.0 |
| Sodium nitrate | 10.0 |
| Nitric acid (60%) | 30.0 |
| Ammonium nitrate | 55.0 |

EXAMPLE XVIII

| | |
|---|---|
| Mineral oil | 14.0 |
| Sorbitan monopalmitate | 14.0 |
| "Gantrez AN-169" | 2.0 |
| Ferric sulfate | 1.0 |
| Sodium nitrate | 10.0 |
| Nitric acid (60%) | 30.0 |
| Ammonium nitrate | 29.0 |

EXAMPLE XIX

| | |
|---|---|
| Paraffin | 4.0 |
| Mineral oil | 2.0 |
| Sorbitan monopalmitate | 2.0 |
| "Gantrez AN-119" | 0.1 |
| Ferric sulfate | 0.1 |
| Sodium nitrate | 10.0 |
| Nitric acid (60%) | 30.0 |
| Ammonium nitrate | 51.8 |

EXAMPLE XX

| | |
|---|---|
| Paraffin | 4.0 |
| Mineral oil | 2.0 |
| Sorbitan monopalmitate | 2.0 |
| "Gantrez AN-119" | 10.0 |
| Ferric sulfate | 1.0 |
| Sodium nitrate | 10.0 |
| Nitric acid (60%) | 30.0 |
| Ammonium nitrate | 41.0 |

EXAMPLE XXI

| | |
|---|---|
| Paraffin | 4.0 |
| Mineral oil | 2.0 |
| Sorbitan monopalmitate | 2.0 |
| "Gantrez AN-139" | 10.0 |
| Ferric sulfate | 1.0 |
| Sodium nitrate | 10.0 |
| Nitric acid (60%) | 20.0 |
| Ammonium nitrate | 51.0 |

EXAMPLE XXII

| | |
|---|---|
| Paraffin | 4.0 |
| Mineral oil | 2.0 |
| Sorbitan monopalmitate | 2.0 |
| "Gantrez AN-169" | 1.0 |
| Ferric sulfate | 1.0 |
| Nitric acid (60%) | 15.0 |
| Ammonium nitrate | 75.0 |

EXAMPLE XXIII

| | |
|---|---|
| Paraffin | 4.0 |
| Mineral oil | 2.0 |
| Sorbitan monopalmitate | 2.0 |
| "Gantrez AN-169" | 1.0 |
| Ferric sulfate | 1.0 |
| Nitric acid (40%) | 15.0 |
| Ammonium nitrate | 75.0 |

EXAMPLE XXIV

| | |
|---|---|
| Paraffin | 6.0 |
| Mineral oil | 2.0 |
| Sorbitan monopalmitate | 2.0 |
| "Gantrez AN-169" | 2.0 |
| Ferric sulfate | 1.0 |
| Nitric acid (60%) | 60.0 |
| Ammonium nitrate | 27.0 |

EXAMPLE XXV

| | |
|---|---|
| Paraffin | 6.0 |
| Mineral oil | 2.0 |
| Sorbitan monopalmitate | 2.0 |
| "Gantrez AN-149" | 2.0 |
| Ferric sulfate | 1.0 |
| Nitric acid (40%) | 60.0 |
| Ammonium nitrate | 27.0 |

EXAMPLE XXVI

| | |
|---|---|
| Paraffin | 6.0 |
| Mineral oil | 2.0 |
| Sorbitan monopalmitate | 2.0 |
| "Gantrez AN-169" | 2.0 |
| Ferric sulfate | 1.0 |
| Nitric acid (60%) | 70.0 |
| Ammonium nitrate | 17.0 |

EXAMPLE XXVII

| | |
|---|---|
| Paraffin | 6.0 |
| Mineral oil | 2.0 |
| Sorbitan monopalmitate | 2.0 |
| "Gantrez AN-169" | 2.0 |
| Ferric sulfate | 1.0 |
| Nitric acid (40%) | 70.0 |
| Ammonium nitrate | 17.0 |

EXAMPLE XXVIII

| | |
|---|---|
| Paraffin | 6.0 |
| Mineral oil | 2.0 |
| Sorbitan monostearate | 2.0 |
| Polyacrylic acid | 2.0 |
| Ferric sulfate | 1.0 |
| Sodium nitrate | 10.0 |
| Ammonium nitrate | 47.0 |
| Nitric acid (60%) | 30.0 |

EXAMPLE XXIX

| | |
|---|---|
| Paraffin | 6.0 |
| Mineral oil | 2.0 |
| Sorbitan monopalmitate | 2.0 |
| "Gantrez AN-169" | 2.0 |
| Triethylenetetramine | 1.0 |
| Sodium nitrate | 10.0 |
| Nitric acid (40%) | 30.0 |
| Ammonium nitrate | 47.0 |

EXAMPLE XXX

| | |
|---|---|
| Paraffin | 6.0 |
| Mineral oil | 2.0 |
| Sorbitan monopalmitate | 2.0 |
| "Gantrez AN-169" | 2.0 |
| Polyethylenimine | 1.0 |
| Sodium nitrate | 10.0 |
| Nitric acid (60%) | 30.0 |
| Ammonium nitrate | 47.0 |

EXAMPLE XXXI

| | |
|---|---|
| Paraffin | 6.0 |
| Mineral oil | 2.0 |
| "Gantrez AN-169" | 2.0 |
| Ferric sulfate | 1.0 |
| Nitric acid (60%) | 30.0 |
| Ammonium nitrate | 49.0 |
| Sodium nitrate | 10.0 |

EXAMPLE XXXII

| | |
|---|---|
| Paraffin | 6.0 |
| Mineral oil | 2.0 |
| "Gantrez AN-169" | 2.0 |
| Ferric sulfate | 1.0 |
| Sorbitan monooleate | 2.0 |
| Nitric acid (60%) | 30.0 |
| Ammonium nitrate | 47.0 |
| Sodium nitrate | 10.0 |

EXAMPLE XXXIII

| | |
|---|---|
| Paraffin | 6.0 |
| Mineral oil | 2.0 |
| Sorbitan monopalmitate | 2.0 |
| "Cyanogum 41" | 2.0 |
| Diethylene-triamine | 1.0 |
| Sodium nitrate | 10.0 |
| Nitric acid (60%) | 30.0 |
| Ammonium nitrate | 47.0 |

All of the above compositions have a density of 1.15–1.20 when prepared.

On testing, all of the compositions represented by the above examples are found to be cap sensitive to commercially available blasting caps.

What is claimed is:

1. An aqueous slurry blasting composition consisting essentially of water, an inorganic nitrate, a nitric acid sensitizer, an acid resistant stabilizer, and entrapped air, said blasting composition having a density of from about 0.5 to about 1.60.

2. A composition of claim 1 wherein the inorganic nitrate is a compound selected from the group consisting of ammonium nitrate, potassium nitrate and sodium nitrate.

3. An aqueous slurry blasting composition consisting essentially of water, an inorganic nitrate, a nitric acid sensitizer, an acid resistant surfactant, and entrapped air, said blasting composition having a density of from about 0.5 to about 1.60.

4. A composition of claim 3 wherein the inorganic nitrate is a compound selected from the group consisting of ammonium nitrate, potassium nitrate, and sodium nitrate.

5. A composition of claim 3 wherein the acid resistant surfactant is selected from the group consisting of sorbitan monooleate, sorbitan monopalmitate, and sorbitan monostearate.

6. A composition of claim 3 wherein an acid resistant stabilizer is included as a component thereof.

References Cited

UNITED STATES PATENTS

| | | | |
|---|---|---|---|
| 1,186,065 | 6/1916 | Aubert et al. | 149—18 |
| 2,768,072 | 10/1956 | Stark | 149—2 X |
| 3,004,842 | 10/1961 | Rowlinson | 149—57 X |
| 3,049,454 | 8/1962 | Stark | 149—2 |
| 3,212,944 | 10/1965 | Lyon et al. | 149—46 X |
| 3,249,474 | 5/1966 | Clay et al. | 149—41 X |
| 3,282,752 | 11/1966 | Clay et al. | 149—22 X |
| 3,288,658 | 11/1966 | Ferguson et al. | 86—20 |
| 3,288,661 | 11/1966 | Swisstack | 149—2 X |
| 3,297,502 | 1/1967 | Chrisp | 149—41 X |

CARL D. QUARFORTH, *Primary Examiner.*

BENJAMIN R. PADGETT, *Examiner.*

S. J. LECHERT, Jr., *Assistant Examiner.*

Disclaimer 3,376,176.—*Neil E. Gehrig*, Schuylkill Haven, Pa. AQUEOUS INORGANIC NITRATE SALT SLURRY CONTAINING NITRIC ACID AND ENTRAPPED AIR. Patent dated April 2, 1968. Disclaimer filed May 20, 1968, by the inventor; the assignee, *Atlas Chemical Industries, Inc.*, consenting.

Hereby disclaims the terminal portion of the term of said patent subsequent to January 5, 1982.

[*Official Gazette July 30, 1968.*]

UNITED STATES PATENT OFFICE
CERTIFICATE OF CORRECTION

Patent No. 3,376,176 April 2, 1968

Neil E. Gehrig

It is certified that error appears in the above identified patent and that said Letters Patent are hereby corrected as shown below:

Column 2, line 9, after "water" insert -- may --. Column 3, line 65, "he" should read -- the --. Column 6, line 36, "49.0" should read -- 57.8 --; line 52, "AN-169" should read -- AN-139 --; line 55, "(40%)" should read -- (60%) --; line 61, "2.0" should read -- 1.5 --; line 64, "(60%)" and "30.0" should read -- (40%) -- and -- 20.0 --; line 65, "29.0" should read -- 39.5 --; line 71, "AN-139" and "1.5" should read -- AN-169 -- and -- 2.0 --; line 74, "20.0" should read -- 30.0 --; line 75, "39.5" should read -- 29.0 --.

Signed and sealed this 2nd day of December 1969.

(SEAL)
Attest:

Edward M. Fletcher, Jr.
Attesting Officer

WILLIAM E. SCHUYLER, JR.
Commissioner of Patents